United States Patent
Aronson et al.

(10) Patent No.: US 9,266,744 B2
(45) Date of Patent: Feb. 23, 2016

(54) SYNTHESIS OF BOROSILICATE TON-FRAMEWORK TYPE MOLECULAR SIEVES

(71) Applicants: Matthew T. Aronson, Santa Barbara, CA (US); Tracy Margaret Davis, Novato, CA (US)

(72) Inventors: Matthew T. Aronson, Santa Barbara, CA (US); Tracy Margaret Davis, Novato, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 394 days.

(21) Appl. No.: 14/051,178

(22) Filed: Oct. 10, 2013

(65) Prior Publication Data

US 2015/0104378 A1    Apr. 16, 2015

(51) Int. Cl.
C01B 39/12    (2006.01)
C01B 39/00    (2006.01)
C01B 39/48    (2006.01)
C01B 37/00    (2006.01)

(52) U.S. Cl.
CPC ........... *C01B 39/00* (2013.01); *C01B 37/007* (2013.01); *C01B 39/12* (2013.01); *C01B 39/48* (2013.01)

(58) Field of Classification Search
CPC ........ C01B 37/007; C01B 39/12; C01B 39/48
See application file for complete search history.

(56) References Cited

U.S. PATENT DOCUMENTS

| | | | |
|---|---|---|---|
| 4,016,218 A * | 4/1977 | Haag et al. | ............. C07C 2/66 |
| 4,481,177 A | 11/1984 | Valyocsik | |
| 4,533,649 A | 8/1985 | Ball et al. | |
| 4,900,528 A | 2/1990 | Lowe et al. | |
| 4,902,406 A | 2/1990 | Valyocsik | |
| 5,342,596 A | 8/1994 | Barri et al. | |
| 8,562,942 B2 * | 10/2013 | Archer et al. | ........... C01B 39/04 |
| 2010/0260665 A1 | 10/2010 | Archer et al. | |
| 2015/0104378 A1 * | 4/2015 | Aronson et al. | ........ C01B 39/00 |
| 2015/0202603 A1 * | 7/2015 | Schmidt et al. | .......... B01J 29/70 |

FOREIGN PATENT DOCUMENTS

| | | |
|---|---|---|
| EP | 0065400 | 11/1982 |
| EP | 0087017 | 8/1983 |
| EP | 0220893 | 5/1987 |

OTHER PUBLICATIONS

L.M. Parker and D.M. Bibby "Synthesis and some properties of two novel zeolites, KZ-1 and KZ-2" Zeolites 1983, 3, 8-11.
B. Marler "Silica-ZSM-22: synthesis and single crystal structure refinement" Zeolites, 1987, 7, 393-397.
S.I. Zones "Synthesis of pentasil zeolites from sodium silicate solutions in the presence of quaternary imidazole compounds" Zeolites 1989, 9, 458-467.
S.I. Zones and A.W. Burton "Diquaternary structure-directing agents built upon charged imidazolium ring centers and their use in synthesis of one-dimensional pore zeolites" J. Mater. Chem. 2005, 15, 4215-4223.
R.H. Archer, S.I. Zones and M.E. Davis "Imidazolium structure directing agents in zeolite synthesis: Exploring guest/host relationships in the synthesis of SSZ-70" Micropor. Mesopor. Mater. 2010, 130, 255-265.
PCT International Search Report, PCT/US2014/038961, mailed Sep. 2, 2014.
R.H. Archer, S.I. Zones and M.E. Davis "Imidazolium structure directing agents in zeolite synthesis: Exploring guest/host relationships in the synthesis of SSZ-70" Micropor. Mesopor. Mater 2010, 130, 255-265.

* cited by examiner

*Primary Examiner* — David M Brunsman
(74) *Attorney, Agent, or Firm* — Terrence M. Flaherty

(57) ABSTRACT

A method is disclosed for synthesizing borosilicate TON-framework type molecular sieves in a hydroxide media using a 1,3-dimethylimidazolium cation or a 1,4-bis(N-methylimidazolium)butane dication as a structure directing agent.

8 Claims, No Drawings

SYNTHESIS OF BOROSILICATE TON-FRAMEWORK TYPE MOLECULAR SIEVES

TECHNICAL FIELD

This disclosure is directed to a method for synthesizing a borosilicate TON-framework type molecular sieve in a hydroxide media using a 1,3-dimethylimidazolium cation or a 1,4-bis(N-methylimidazolium)butane dication as a structure directing agent.

BACKGROUND

Molecular sieves are a commercially important class of crystalline materials. They have distinct crystal structures with ordered pore structures which are demonstrated by distinct X-ray diffraction patterns. The crystal structure defines cavities and pores which are characteristic of the different species.

Molecular sieves are classified by the Structure Commission of the International Zeolite Association according to the rules of the IUPAC Commission on Zeolite Nomenclature. According to this classification, framework type zeolites and other crystalline microporous molecular sieves, for which a structure has been established, are assigned a three letter code and are described in the "Atlas of Zeolite Framework Types," Sixth Revised Edition, Elsevier (2007).

One known molecular sieve for which a structure has been established is the material designated as TON, which is a crystalline material having one-dimensional 10-membered ring channels. Examples of TON-framework type molecular sieves include ISI-1, KZ-2, NU-10, Theta-1 and ZSM-22. TON-framework type materials are of significant commercial interest because of their activity as catalysts in dewaxing of paraffinic hydrocarbons.

Borosilicate molecular sieves can be of interest when a molecular sieve of reduced acidity is desired. A borosilicate molecular sieve having the TON-framework type is reported to have been hydrothermally synthesized using a 1,3-dimethylimidazolium cation as the structure directing agent, but the synthesis requires the presence of concentrated hydrofluoric acid. See R. H. Archer et al., *Micropor. Mesopor. Mater.* 2010, 130, 255-265. An amorphous material was produced from a borosilicate hydroxide-mediated reaction gel when a 1,3-dimethylimidazolium cation was used as the structure directing agent.

The use of fluoride in molecular sieve reaction gels is undesirable on a large scale because of the potential hazards involved. There thus remains a need for a method of synthesizing borosilicate TON-framework type molecular sieves that eliminates the need for a source of fluoride.

SUMMARY

In one aspect, there is provided a method for preparing a borosilicate TON-framework type molecular sieve by contacting under crystallization conditions: (1) at least one source of silicon; (2) at least one source of boron; (3) hydroxide ions; and (4) a structure directing agent selected from the group consisting of a 1,3-dimethylimidazolium cation and a 1,4-bis(N-methylimidazolium)butane dication.

In another aspect, there is provided a process for preparing borosilicate TON-framework type molecular sieve by: (a) preparing a reaction mixture containing (1) at least one source of silicon; (2) at least one source of boron; (3) at least one source of an element selected from Groups 1 and 2 of the Periodic Table; (4) hydroxide ions; (5) a structure directing agent selected from the group consisting of a 1,3-dimethylimidazolium cation and a 1,4-bis(N-methylimidazolium) butane dication; and (6) water; and (b) maintaining the reaction mixture under crystallization conditions sufficient to form crystals of the molecular sieve.

In yet another aspect, there is provided a borosilicate TON-framework type molecular sieve having a composition, as-synthesized and in its anhydrous state, in terms of mole ratios, as follows:

|      | Broad        | Exemplary    |
|------|--------------|--------------|
| Si/B | 40 to 200    | 40 to 100    |
| Q/Si | 0.01 to 0.05 | 0.01 to 0.05 |
| M/Si | 0 to 0.05    | 0 to 0.05    | wherein Q is a structure directing agent selected from the group consisting of a 1,3-dimethylimidazolium cation and a 1,4-bis(N-methylimidazolium)butane dication; and M is selected from the group consisting of elements from Groups 1 and 2 of the Periodic Table.

DETAILED DESCRIPTION

Introduction

The following terms will be used throughout the specification and will have the following meanings unless otherwise indicated.

The term "borosilicate" refers to a molecular sieve containing oxides of both boron and silicon.

The term "Periodic Table" refers to the version of IUPAC Periodic Table of the Elements dated Jun. 22, 2007, and the numbering scheme for the Periodic Table Groups is as described in *Chem. Eng. News*, 63(5), 26-27 (1985).

In preparing borosilicate TON-type molecular sieves, a 1,3-dimethylimidazolium cation or a 1,4-bis(N-methylimidazolium)butane dication is used as a structure directing agent ("SDA"), also known as a crystallization template. The SDAs useful for making the molecular sieve are represented by the following structures (1) and (2):

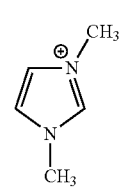

(1)

1,3-dimethylimidazolium cation

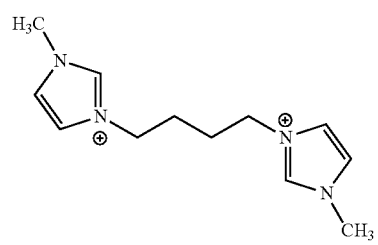

(2)

1,4-bis(N-methylimidazolium)butane dication

The SDA cation is typically associated with anions which can be any anion which is not detrimental to the formation of the molecular sieve. Representative anions include elements from Group 17 of the Periodic Table (e.g., fluoride, chloride, bromide and iodide), hydroxide, acetate, sulfate, tetrafluoroborate, carboxylate, and the like.

Reaction Mixture

In general, the borosilicate TON-framework type molecular sieve is prepared by: (a) preparing a reaction mixture containing (1) at least one source of silicon; (2) at least one source of boron; (3) at least one source of an element selected from Groups 1 and 2 of the Periodic Table; (4) hydroxide ions; (5) a structure directing agent selected from the group consisting of a 1,3-dimethylimidazolium cation and a 1,4-bis(N-methylimidazolium)butane dication; and (6) water; and (b) maintaining the reaction mixture under crystallization conditions sufficient to form crystals of the molecular sieve.

The composition of the reaction mixture from which the borosilicate TON-framework type molecular sieve is formed, in terms of mole ratios, is identified in Table 1 below, wherein compositional variables M and Q are as described herein above.

TABLE 1

| Components | Broad | Exemplary |
|---|---|---|
| Si/B | 20 to 200 | 20 to 120 |
| M/Si | 0.05 to 1.0 | 0.05 to 0.30 |
| Q/Si | 0.05 to 0.50 | 0.05 to 0.30 |
| OH/Si | 0.05 to 0.80 | 0.05 to 0.40 |
| $H_2O$/Si | 15 to 100 | 25 to 80 |

Suitable sources of silicon include fumed silica, precipitated silicates, silica hydrogel, silicic acid, colloidal silica, tetra-alkyl orthosilicates (e.g., tetraethyl orthosilicate) and silica hydroxides.

Suitable sources of boron include borosilicate glasses, alkali-metal borates, boric acid, borate esters, and certain molecular sieves.

As described herein above, the reaction mixture can include at least one source of an element selected from Groups 1 and 2 of the Periodic Table (referred to herein as M). In one sub-embodiment, the reaction mixture is formed using a source of an element from Group 1 of the Periodic Table. In another sub-embodiment, the reaction mixture is formed using a source of sodium (Na). Any M-containing compound which is not detrimental to the crystallization process is suitable. Sources for such Groups 1 and 2 elements include oxides, hydroxides, halides, nitrates, sulfates, oxalates, citrates and acetates thereof.

For each embodiment described herein, the reaction mixture is substantially free of fluoride ions. The terms "substantially free of fluoride ions," "substantially fluoride-free" and "substantially in the absence of fluoride ions," as used herein, are synonymous and mean fluoride ions are completely absent from the reaction mixture or are present in quantities that have less than a measureable effect on, or confer less than a material advantage to, the synthesis of the molecular sieves described herein (e.g., $F^-$ is present as an impurity of one or more of the reactants). A reaction mixture substantially free of fluoride ions will typically contain, for example, a F/Si molar ratio of from 0 to 0.1, e.g., from 0 to 0.05 or from 0 to 0.01.

For each embodiment described herein, the molecular sieve reaction mixture can be supplied by more than one source. Also, two or more reaction components can be provided by one source. As an example, borosilicate molecular sieves may be synthesized from boron-containing beta molecular sieves, as taught in U.S. Pat. No. 5,972,204.

The reaction mixture can be prepared either batch-wise or continuously. Crystal size, crystal morphology and crystallization time of the borosilicate TON-framework type molecular sieve described herein can vary with the nature of the reaction mixture and the crystallization conditions.

Crystallization and Post-Synthesis Treatment

In practice, the molecular sieve is prepared by: (a) preparing a reaction mixture as described herein above; and (b) maintaining the reaction mixture under crystallization conditions sufficient to form crystals of the molecular sieve.

The reaction mixture is maintained at an elevated temperature until the molecular sieve is formed. The hydrothermal crystallization is usually conducted under pressure, and usually in an autoclave so that the reaction mixture is subject to autogenous pressure, at a temperature between 125° C. and 200° C.

The reaction mixture can be subjected to mild stirring or agitation during the crystallization step. It will be understood by one skilled in the art that the molecular sieves described herein can contain impurities, such as amorphous materials, unit cells having framework topologies which do not coincide with the molecular sieve, and/or other impurities (e.g., organic hydrocarbons).

During the hydrothermal crystallization step, the molecular sieve crystals can be allowed to nucleate spontaneously from the reaction mixture. The use of crystals of the molecular sieve as seed material can be advantageous in decreasing the time necessary for complete crystallization to occur. In addition, seeding can lead to an increased purity of the product obtained by promoting the nucleation and/or formation of the molecular sieve over any undesired phases. When used as seeds, seed crystals are added in an amount between 1% and 10% of the weight of the source of silicon used in the reaction mixture.

Once the molecular sieve has formed, the solid product is separated from the reaction mixture by standard mechanical separation techniques such as filtration. The crystals are water-washed and then dried to obtain the as-synthesized molecular sieve crystals. The drying step can be performed at atmospheric pressure or under vacuum.

The molecular sieve can be used as-synthesized, but typically will be thermally treated (calcined). The term "as-synthesized" refers to the molecular sieve in its form after crystallization, prior to removal of the SDA cation. The SDA can be removed by thermal treatment (e.g., calcination), preferably in an oxidative atmosphere (e.g., air, gas with an oxygen partial pressure of greater than 0 kPa) at a temperature readily determinable by one skilled in the art sufficient to remove the SDA from the molecular sieve. The SDA can also be removed by photolysis techniques (e.g., exposing the SDA-containing molecular sieve product to light or electromagnetic radiation that has a wavelength shorter than visible light under conditions sufficient to selectively remove the organic compound from the molecular sieve) as described in U.S. Pat. No. 6,960,327.

The molecular sieve can subsequently be calcined in steam, air or inert gas at temperatures ranging from 200° C. to 800° C. for periods of time ranging from 1 to 48 hours, or more. Usually, it is desirable to remove the extra-framework cation (e.g., $Na^+$) by ion-exchange or other known method and replace it with hydrogen, ammonium, or any desired metal-ion.

Where the molecular sieve formed is an intermediate material, the target molecular sieve can be achieved using post-synthesis techniques such as heteroatom lattice substitution techniques. The target molecular sieve can also be achieved by removing heteroatoms from the lattice by known techniques such as acid leaching.

Characterization of the Molecular Sieve

Borosilicate TON-framework type molecular sieves made by the process described herein have a composition, as-synthesized and in the anhydrous state, as described in Table 2 (in terms of mole ratios), wherein compositional variables Q and M are as described herein above:

TABLE 2

|      | Broad       | Exemplary   |
|------|-------------|-------------|
| Si/B | 40 to 200   | 40 to 100   |
| Q/Si | 0.01 to 0.05 | 0.01 to 0.05 |
| M/Si | 0 to 0.05   | 0 to 0.05   |

The TON-framework type molecular sieves synthesized by the process described herein are characterized by their X-ray diffraction pattern (XRD). X-ray diffraction patterns representative of TON-framework type molecular sieves can be referenced in M. M. J. Treacy et al., "Collection of Simulated XRD Powder Patterns for Zeolites," Fifth Revised Edition, 2007 of the International Zeolite Association. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation and from variations in the Si/B mole ratio from sample to sample. Calcination can also cause minor shifts in the X-ray diffraction pattern. Notwithstanding these minor perturbations, the basic crystal lattice structure remains unchanged.

EXAMPLES

The following illustrative examples are intended to be non-limiting.

Examples 1-16

Crystalline materials were synthesized by preparing the gel compositions (i.e., reaction mixtures) having the compositions, in terms of mole ratios, shown in Table 3 below. The source of silicon was tetraethyl orthosilicate. The source of boron was sodium tetraborate decahydrate. The resulting gel was placed in a Parr autoclave and heated in an oven at 150-160° C. The autoclave was tumbled at 43 rpm for 4-7 days. The autoclave was then removed and allowed to cool to room temperature. The solids were then recovered by filtration and washed thoroughly with deionized water. The resulting products were analyzed by powder X-ray diffraction.

1,6-Hexanediame was used as the SDA in Example 16. U.S. Pat. Nos. 4,900,528 and 4,902,406 disclose the synthesis of aluminosilicate TON-framework type molecular sieves using 1,6-hexanediamine as the SDA.

TABLE 3

| Ex. No. | Si/B | Q/Si | Q | $M^1$/Si | $H_2O$/Si | TON seeds (wt. %) | Product | Product Si/B | $V_{micro}$ (cm$^3$/g) |
|---|---|---|---|---|---|---|---|---|---|
| 1  | 25  | 0.2 | 1,3-dimethylimidazolium iodide | 0.22 | 55 | 0   | TON | 42 |      |
| 2  | 50  | 0.2 | 1,3-dimethylimidazolium iodide | 0.22 | 55 | 0   | TON | 65 | 0.11 |
| 3  | 25  | 0.2 | 1,3-dimethylimidazolium iodide | 0.24 | 55 | 0   | TON |    |      |
| 4  | 25  | 0.2 | 1,3-dimethylimidazolium iodide | 0.24 | 55 | 3.0 | TON |    |      |
| 5  | 50  | 0.2 | 1,3-dimethylimidazolium iodide | 0.23 | 55 | 0   | TON |    |      |
| 6  | 50  | 0.2 | 1,3-dimethylimidazolium iodide | 0.23 | 55 | 3.0 | TON |    |      |
| 7  | 50  | 0.2 | 1,3-dimethylimidazolium iodide | 0.23 | 55 | 0   | TON |    |      |
| 8  | 50  | 0.2 | 1,3-dimethylimidazolium iodide | 0.23 | 55 | 0   | TON |    |      |
| 9  | 50  | 0.2 | 1,3-dimethylimidazolium iodide | 0.23 | 55 | 3.0 | TON |    |      |
| 10 | 25  | 0.2 | 1,3-dimethylimidazolium hydroxide | 0.24 | 55 | 0 | TON |    |      |
| 11 | 50  | 0.2 | 1,3-dimethylimidazolium hydroxide | 0.23 | 55 | 0 | TON |    |      |
| 12 | 100 | 0.2 | 1,3-dimethylimidazolium hydroxide | 0.06 | 55 | 0 | TON |    |      |
| 13 | 50  | 0.1 | 1,4-bis(N-methylimidazolium)butane dibromide | 0.23 | 55 | 0 | TON |    |      |
| 14 | 50  | 0.1 | 1,4-bis(N-methylimidazolium)butane dibromide | 0.23 | 55 | 3.0 | TON | 47 |    |
| 15 | 100 | 0.1 | 1,4-bis(N-methylimidazolium)butane dihydroxide | 0.06 | 55 | 0 | TON |    |      |
| 16 | 50  | 0.3 | 1,6-hexanediamine | 0.29 | 40 | 0 | cristobalite |    |    |

[1]M = Na for Examples 1-15; M = K for Example 16

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A method for preparing a borosilicate TON-framework type molecular sieve, comprising:
   (a) preparing a reaction mixture containing: (1) at least one source of silicon; (2) at least one source of boron; (3) at least one source of an element selected from Groups 1 and 2 of the Periodic Table; (4) hydroxide ions; (5) a structure directing agent selected from the group consisting of a 1,3-dimethylimidazolium cation and a 1,4-bis(N-methylimidazolium)butane dication; and (6) water; and
   (b) maintaining the reaction mixture under crystallization conditions sufficient to form crystals of the molecular sieve.

2. The method of claim 1, wherein the molecular sieve is prepared from a reaction mixture comprising, in terms of mole ratios, the following:

| | |
|---|---|
| Si/B | 20 to 200 |
| M/Si | 0.05 to 1.0 |
| Q/Si | 0.05 to 0.50 |
| OH/Si | 0.05 to 0.80 |
| $H_2O$/Si | 15 to 100 | wherein:
   (1) M is selected from the group consisting of elements from Groups 1 and 2 of the Periodic Table; and
   (2) Q is a structure directing agent selected from the group consisting of a 1,3-dimethylimidazolium cation and a 1,4-bis(N-methylimidazolium)butane dication.

3. The method of claim 2, wherein the molecular sieve is prepared from a reaction mixture comprising, in terms of mole ratios, the following:

| | |
|---|---|
| Si/B | 20 to 120 |
| M/Si | 0.05 to 0.30 |
| Q/Si | 0.05 to 0.30 |
| OH/Si | 0.05 to 0.40 |
| $H_2O$/Si | 25 to 80. |

4. The method of claim 1, wherein the structure directing agent is a 1,3-dimethylimidazolium cation.

5. The method of claim 1, wherein the structure directing agent is a 1,4-bis(N-methylimidazolium)butane dication.

6. The method of claim 1, wherein the molecular sieve has a composition, as-synthesized and in its anhydrous state, in terms of mole ratios, as follows:

| | |
|---|---|
| Si/B | 40 to 200 |
| Q/Si | 0.01 to 0.05 |
| M/Si | 0 to 0.05 | wherein:
   (1) Q is a structure directing agent selected from the group consisting of a 1,3-dimethylimidazolium cation and a 1,4-bis(N-methylimidazolium)butane dication; and
   (2) M is selected from the group consisting of elements from Groups 1 and 2 of the Periodic Table.

7. The method of claim 6, wherein Q is a 1,3-dimethylimidazolium cation.

8. The method of claim 6, wherein Q is a 1,4-bis(N-methylimidazolium)butane dication.

* * * * *